United States Patent [19]

Oishi

[11] Patent Number: 4,912,746
[45] Date of Patent: Mar. 27, 1990

[54] LINEAR DC BRUSHLESS MOTOR

[75] Inventor: Tetsuo Oishi, Ise, Japan

[73] Assignee: Shinko Denki Kabushiki Kaisha, Tokyo, Japan

[21] Appl. No.: 231,556

[22] Filed: Aug. 12, 1988

[30] Foreign Application Priority Data

Aug. 15, 1987 [JP] Japan .................. 62-202619
Aug. 17, 1987 [JP] Japan .................. 62-203161
Aug. 17, 1987 [JP] Japan .................. 62-203162

[51] Int. Cl.$^4$ ............................................ H02K 41/00
[52] U.S. Cl. ................................................ 310/12
[58] Field of Search ........................... 310/12; 318/135

[56] References Cited

U.S. PATENT DOCUMENTS 4,255,494  3/1981  Reen et al. ..................... 310/44

FOREIGN PATENT DOCUMENTS 0847456  7/1981  U.S.S.R. ........................ 310/12

Primary Examiner—Peter S. Wong
Assistant Examiner—Judson H. Jones
Attorney, Agent, or Firm—Armstrong, Nikaido, Marmelstein, Kubovcik & Murray

[57] ABSTRACT

Since the DC linear brushless motor is constructed based on a principle that an ordinary DC brushless motor is developed into a linear shape, it is inevitable that its stator should have a large number of permanent magnets arrayed linearly and the adjacent poles of which are separated by many gaps, in addition, that its armature core has a finite length at each end in the direction of the travel of the moving member. Both the gaps or boundaries between adjacent magnetic poles of the stator and the teeth slots as well as the both ends in the armature core result in synthesized detent thrusts, and these detent thrusts are not preferable for applying this type linear motor to OA devices or precise measuring device. Though it is possible to reduce the detent thrust due to the gaps or boundaries between poles in the stator and the parallel slots between the teeth of the armature core by arraying the permanent magnets in skewed manner with respect to the lengthwise axis of the stator, there has not been suitable and effective way to reduce or eliminate the detent thrust caused by the end effect of the armature core. In view of this, the linear DC brushless motor of this type has solved the problem by reducing the unit volume of the tooth or teeth at the axial ends of the armature core by either cutting out a part of the tooth or teeth, attaching a rightangled triangular pillar(s) or by slantly cutting the teeth at each end of an armature core in the direction of travel.

14 Claims, 4 Drawing Sheets

LINEAR DC BRUSHLESS MOTOR

BACKGROUND OF THE INVENTION

1. Field of the Invention

This invention relates to a linear DC brushless motor, and more particularly, to a linear DC brushless motor incorporating an armature core which can remarkably reduce detent thrust or drive force, in other words, can reduce such detent thrust caused by an end effect of its armature core attributable to its peculiar nature that the armature core of a linear motor must inevitably be composed of a linear core having a finite or limited length, namely having both ends in the direction of travel.

2. Prior Art

As linear motors have increasingly been applied to the office automation (OA) devices or to precision measuring instruments, various demands have been raised with respect to their servo control performance or precise positioning characteristics and as a consequence, linear DC brushless motors have attracted user's interest as one which is particularly suitable for such usage.

Generally, a linear DC brushless motor (hereinafter merely referred to LDM) is constructed based on such a manner that an ordinary DC brushless motor (or AC servomotor) is reformed into a linear shape. As its general construction of an LDM is shown in FIG. 7, movable element, namely, an armature core 1 is reciprocally movable right and left along its travel of motion shown by an arrow line in FIG. 7. The armature core 1 has a large number of teeth 1A or "comb teeth".

In the slots defined between successively adjacent teeth of the core, plurality of coils are fitted to make up a set of armature core in the movable element. In more detail, one of the legs of a preformed toroidal coil, say a first coil is inserted into one slot of the core between two teeth adjacent with each other expecting those at both ends in the direction of travel of the motor, the next leg, in a similar manner, to the next slot, and further leg(s) of the coil or a subsequent coil is inserted in the subsequent slot, one after another to make up a set of an armature core.

With regard to the stator, a large number of permanent magnets constituting a linear stator are arrayed on a plate of magnetic material to form an alternate magnetic pole arrangement as shown also in the drawing.

The relative position of the armature core with respect to the stator is detected by a sensor (not shown). Incorporated further in the LDM system are a control circuit 5 and a driver 6, the former controls the current to be supplied to each coil 2, responsive to the relative position of these two elements detected by the sensor, while the latter supplies the thus controlled current to the coils through a power feed line 7. There have been found undesirable phenomena in such type LDM, referred to "detent thrust" or "rippled thrust" attributable to the inherent magnetic pole construction of the stator, and one of the measures taken heretofore to reduce the detent thrust is such one as shown by FIG. 8, namely, permanent magnets 4 of the stator are arrayed parallel in skewed relation with respect to the length-wise axis of the stator 3.

It becomes possible to reduce the detent thrust caused by both the gaps or boundaries between adjacent magnetic poles and the teeth slots, by relying on the aforesaid skewed arraying of the stator permanent magnets, however, other problems of detent thrust due to the end effect of the armature core, that is, abrupt change in permeance from full value to almost zero, or viceversa, between the end touch and the exterior of the armature core, have not yet been solved.

These unsolved problems of the latter type are attributable to such inherent nature of the linear motor that the armature core which moves in itself or is movable relative to the stator has a finite length, namely, having both ends and this is the cause of the detent thrust as mentioned above which cannot be solved only by arraying the stator permanent magnets in a skewed manner as explained above.

SUMMARY OF THE INVENTION

In view of the drawbacks mentioned above, the present invention aims to provide a linear DC brushless motor which can solve the drawbacks in the prior art linear DC brushless motor as mentioned above and further remarkably reduce the detent thrust caused by the end effect of the armature core and thereby able to perform smooth running even at a low speed.

Explanation will now be made in the following paragraphs as to by what technical concept the present invention has solved the pending problem of detent thrust and to what extent the detent thrust could be reduced by gradually reducing the unit volume of the core, for example, by partly cutting out at least one tooth at each end of the armature core in the direction of the travel of the linear motor, thereby avoiding abrupt chage of the permeance of the armature core.

The detent thrust when no measure is taken to reduce the end effect of the armature core is represented, as shown in FIG. 3 by a sinusoidal curve A having a length of period equal to the pitch of the poles, that is, the length of one permanent magnet pole (N pole or S pole).

If each of a pair of end teeth 1B of the armature core 1 is partly cut away by transversely cutting a half of the length 1 as shown in FIG. 1, the detent thrust can be reduced to such one having a half amplitude but the same phase, as shown by the wave form B in FIG. 3, as compared with the case where no such measures has been taken, shown by curve A of FIG. 3.

Next, the detent thrust attributable to the second tooth 1C from each end of the armature core will be considered.

The wave form under this condition can be represented by the curve C in FIG. 3 having a half amplitude and a shifted phase as compared with those of curve A. Assuming the teeth pitch of the armature core is set such that three teeth of the armature core are disposed per each pole length of the permanent magnetic pole (N pole or S pole), the shift of the phase will be 120° as shown by the dash and dot line C in FIG. 3.

First embodiment of the present invention adopted such an armature having a pair of outermost end teeth at each end in the direction of travel (hereafter merely referred to "end") being partly cut away, and the total detent thrust effected by this measure is represented by the curve D in FIG. 3, which is obtained by synthesizing two sinusoidal curves B and C of the same period and a half amplitude of curve A but its phase being shifted.

Consequently, if the extent of skewing at the two axial ends of the armature core is set S equal to the length of one pole of the permanent magnet of the stator, the detent thrust due to the end effect can be made cancelled with each other within a polar pitch (0 to 2π), so it would become possible to reduce the detent thrust under problem.

According to the second embodiment of the present invention, outermost tooth at each end of the armature core 1 is attached integrally with at least one end member of right-angled triangular pillar.

In the third embodiment of the present invention, outermost tooth and plural teeth disposed inside next to the outermost tooth at each end of the armature core 1 are slantly cut away as if they were cut by a vertical plane passing through the outer ridge of the outermost pole and through the outer ridge of the transversely oppsite side of the armature core.

Similarly, in this case too, the detent thrust can be made such one as represented by a gentle curve without having any appreciable abrupt change in the permeance, thus ripples in the thrust can be remarkably reduced.

Reduction in the detent thrust, namely, the ripples in the thrust brought about by reducing the volume of the axially end portion of the armature by means of the above mentioned embodiments is generally referred to a skew effect obtained by the modified armature configuration of the tooth or teeth at both axial end.

As to the coils used in the present invention, coils of any particular size or shape corresponding to the modified teeth end construction are not required, but prefabricated ordinary toroidal coils for specific model linear motor can be used by inserting each leg of them in the slot between the adjacent teeth as a usual manner, this is because the volume of the coils at the end portion of the armature core exceeding the reduced volume of the end tooth or teeth merelely acts as idle portions which impart no substantial disadvantage to the permeance of this type of linear motor. It goes without saying that the coils, if it is preferred, may be made to have a shape corresponding to the modified shape of slot or sloots between the teeth at the end portiopn of the core.

Explanation will now be made in the following part of the specification by referring to accompanying drawings.

DESCRIPTION OF THE PREFERRED EMBODIMENTS

Figure 1:
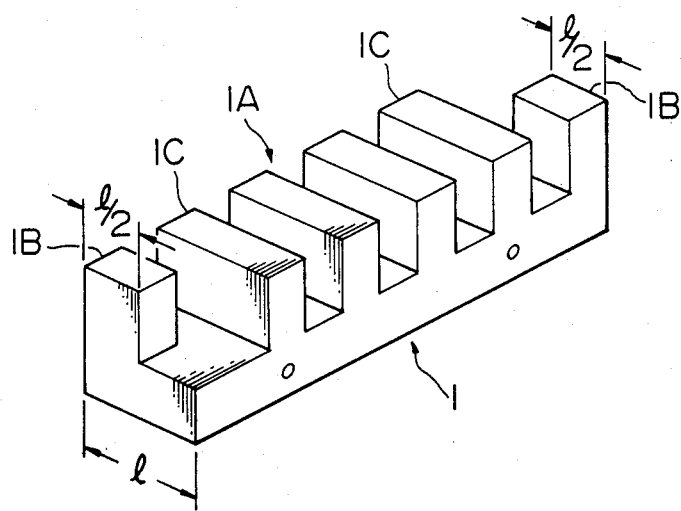
FIG. 1 is a perspective view of an armature core showing an example of the first embodiment of the present invention.
Figure 7:
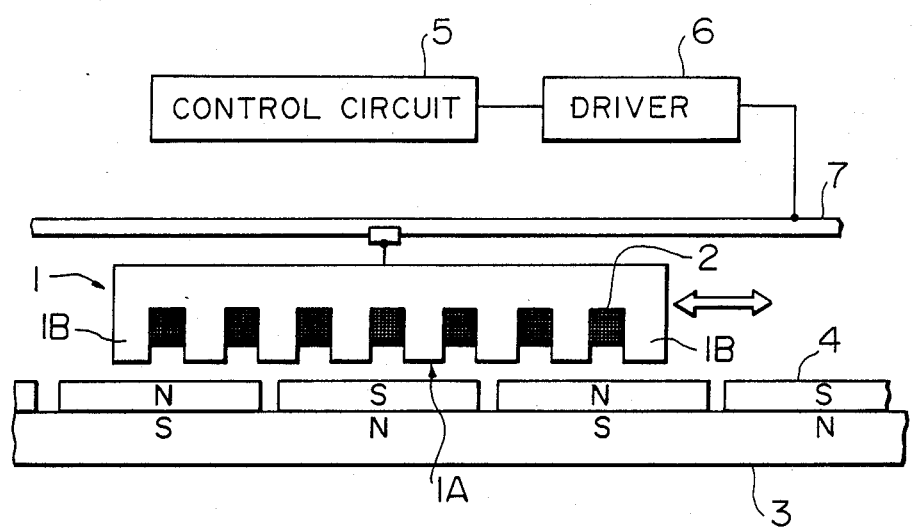
FIG. 7 is a front view showing a general construction and arrangement of the conventional linear DC brushless motor.
Figure 8:
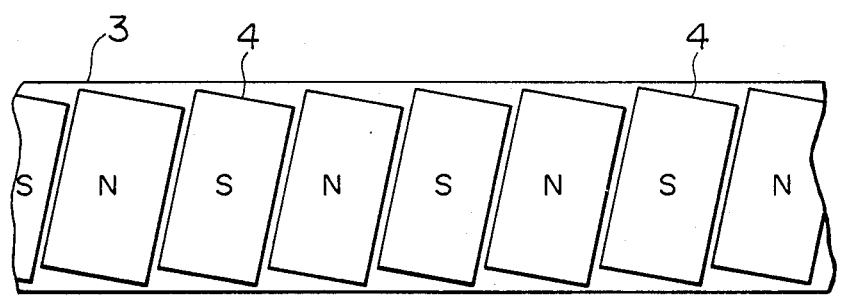
FIG. 8 is a plan view showing the skewed arrangement of the permanent magnets in the stator of the conventional linear DC brushless motor shown in FIG. 7.

Referring now to FIG. 1, the structural parts and portions constitute the present invention being the same as or equal to that referred to in the prior art shown by FIGS. 7 and 8 are shown by using the same reference numeral(s), in order to help reader's clear understanding by way of comparison and further the detailed explanation thereof are omitted. FIG. 1 is a perspective view showing an entire part of the armature core 1, in which the tooth 1B at each axial end of the core 1 is formed to have its length one half the transverse length l of the core 1 as can be clearly seen from the drawing. The armature core 1 can be made by stacking a large number of thin sheets of steel for electric use such as silicon steel, one after another, and thus forming the core 1 as an integral member in a effective manner as explained below.

This can be done in the following way, first by making steel sheets each having n minus one (n−1) teeth (where n is the specified teeth number of the core 1), in other words, one end of each sheet having teeth of specified number is cut away so as to remove one tooth, then stacking the thus prepared sheets until the stacked sheets amount to a half thickness of the specified transverse length l of the core 1 and then by stacking another half thickness by reversing and stacking the sheets in such a way that the other ends of the sheets having no end tooth are placed at opposite end.

Alternatively, the armature core of this configuration can be made by compacting powdered iron.

Figure 2:
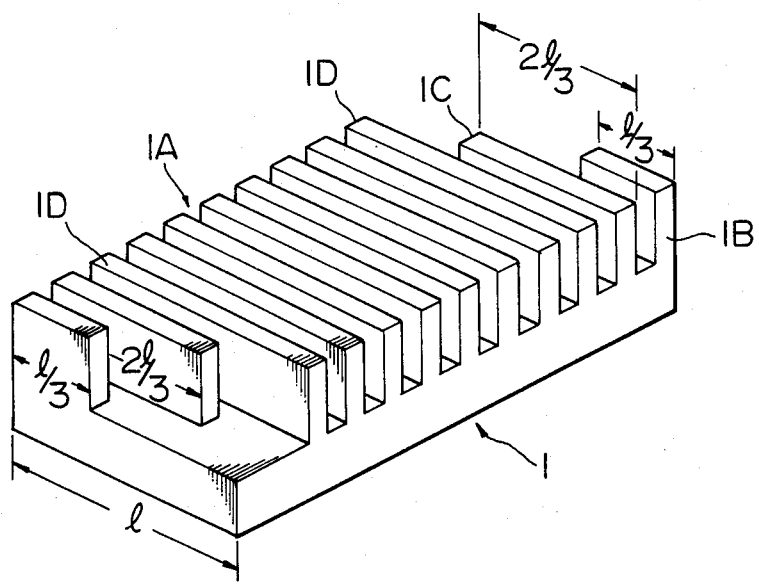
FIG. 2 is a perspective view of an armature core showing another example of the first embodiment.

FIG. 2 shows the construction according to another example of the first embodiment of the present invention, in this case the outermost end tooth 1B at each axial end of the armature core is formed to have one third of the transverse length l of the armature core, while the second tooth from each axial end of the armature core is formed to have two thirds of the transverse length l of the armature core. If other tooth or teeth adjacent to the thus cut teeth at each end is cut away, the detent thrust of the armature core can be further reduced.

Figure 3:
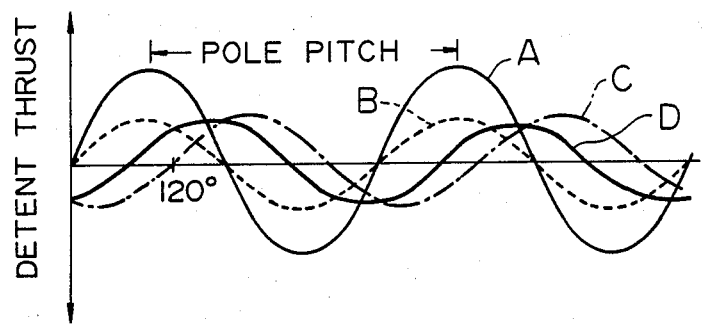
FIG. 3 is a graph showing a relationship between the pole pitch and the detent thrust when a part of the tooth or teeth on each axial end of the armature core have been cut away or attached with triangular pillar or pillars.

By virtue of using the armature core 1 having a shape as shown by FIG. 1, the detent thrust at one core end effected by the cut away tooth 1B can be reduced to such an extent as having one half amplitude and the same phase but having no such cut away tooth (curve B of FIG. 3). The detent thrust at each axial end effected by the second tooth 1C from the end can be represented by the curve C (dash and dot line in FIG. 3), that is, the detent thrust has a wave form in FIG. 3 showing a half amplitude and shifted phase, thus the synthesized detent thrust effected by the armature core 1 can be shown by curve D having reduced amplitude of the prior art core. The extent of such phase shift varies depending on the number of teeth per one pole, for example, if three teeth are set for each pole, the phase shift would be 120°.

The wave form of the detent thrust caused by the end effect will be represented by sinusoidal curve shown in FIG. 3 having their one period equal to the length of polar pitch.

Accordingly, if the skew at the end is set to be a polar pitch, the detent thrust cancel with each other between 0 and $2\pi$ and thereby large extent of reduction is obtainable.

Figure 4:
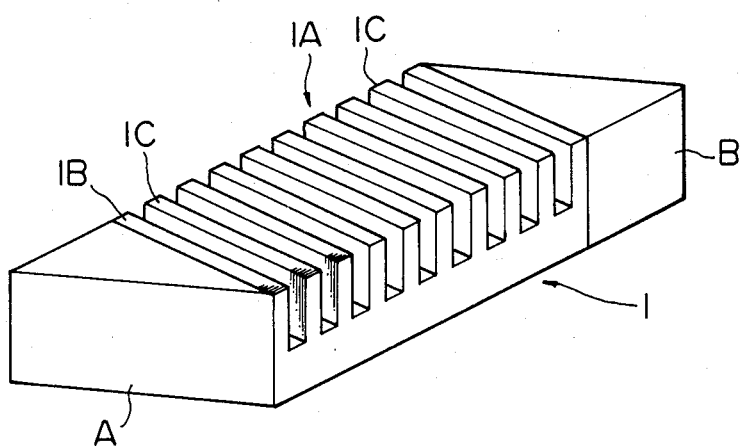
FIG. 4 is a perspective view of an armature core showing an example of the second embodiment of the present invention.

Explanation will now be made on the second embodiment of the present invention. In FIG. 4, the member or parts the same as or equal to those used for the conventional device are also shown by the same numeral used in FIGS. 7 and 8 and the explanation thereof is also omitted. FIG. 4 is a perspective view showing an entire part of the armature core 1 according to the second embodiment of the present invention. In FIG. 4, each of the end pillar members A or B has right angled triangular top and bottom faces each having its width and height the same as that, respectively, of the armature core 1 and is made of material for magnetic use such as structural carbon steel of JIS Standards SS 41 and it is attached to the end teeth 1B at right or left end of the armature core 1 by means of a bonding agent or the like.

The top ridges of the thus attached end pillar members are directed opposite with respect to its lengthwise axis, that is the direction of the top ridge of the pillar A at the front lower part is directed rightward, while that of the top ridge of the pillar B at the rear upper part is directed leftward.

As a way of making, the core can be readily produced by stacking a large number of preformed thin sheets of material such as silicon steel one on another into a laminated structure and by attaching an end member A or B on the outer face of the thus prepared respective end tooth 1B.

Instead of using laminated thin silicon steel sheets, the armature core of this type also can be formed by compaction.

By virtue of the armature core 1 formed into such a configuration as mentioned above, the core 1 as a whole can impose a skew effect to reduce the detent thrust otherwise generates in the armature core itself.

Detent thrust reduced by the core end construction in accordance with this embodiment can be represented by sinusoidal curves having its period equal to a polar pitch as shown in the FIG. 3.

Accordingly, if the extent of skew in the direction of the travel of the armature core is selected as a polar pitch, the detent thrust due to the end effect can be cancelled within the polar pitch of 0 to $2\pi$ thereby large extent of meritorious effect for reducing the detent thrust can be attained.

Figure 5:
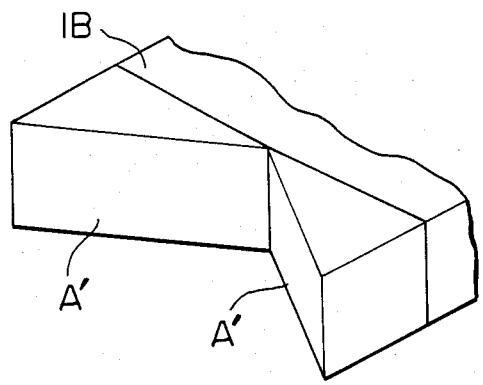
FIG. 5 is a perspective view of an armature core showing another example of the second embodiment.

FIG. 5 shows another example of the second embodiment of the present invention, wherein the end face of the end tooth 1B at each axial end is attached with two right-angled triangular pillars of equal shape and size. The top and bottom faces of right-angled triangular shape have two sides forming the right-angle, having a length of 1/2 of the transverse width l of the armature core 1, thereby two rectangular side faces of equal size are formed in one pillar, and one side face out of the two rectangular side faces are selected to be placed on the end face of the end tooth and one rectangular side face of the other triangular pillar is similarly placed on the end face of the end tooth such that the two pillars are placed side by side on the end face of the end tooth 1B in a manner that their top ridges are placed being opposed head to head with each other.

Figure 6:
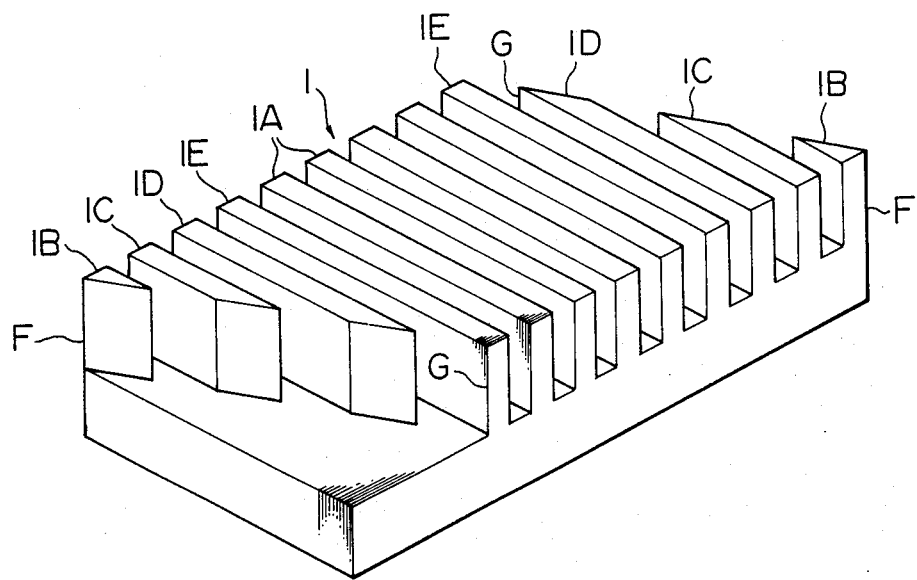
FIG. 6 is a perspective view of an armature core showing an example of the third embodiment of the present invention.

FIG. 6 is a perspective view showing a preferred form of the entire part of the armature core 1 according to the third embodiment of the present invention. Outermost end tooth 1B, the next tooth 1C and the further next tooth 1D at each axial end portion of the armature core 1 are shown, having their respective cut end as if they have been slantly cut by a plane passing through the transversely outermost ridge G of the end tooth 1B and the ridge F of the fourth tooth 1E, in more detail, the outermost ridge G of the fourth tooth for forming the cut teeth at the lower front side is shown at right side of FIG. 6, but the ridge G forming the cut teeth at the rear upper side is shown at the left upper part of FIG. 6.

In a similar manner as explained in the preceding embodiment, the armature core 1 including the slantly cut teeth at the ends can be made by stacking a large number of thin sheets of silicon steel into a laminated state or by compacting powdered iron instead of silicon steel sheets. By virtue of the armature core 1 constructed to have such a configuration as explained above, the entire core member can impose a skew effect on the set of permanent magnets 4, thereby if the extent of skew is set, for example, equal to the pitch of the poles, the detent thrusts caused by the end effect can be largely reduced since they are cancelled each other within a range of pole pitch (0 to $2\pi$).

As explained above, the detent thrust encountered in the armature core of the linear DC brushless motor can be greatly reduced by applying very simple structural modification to the end portion of the core in the following manner, (1) either cutting out only the outermost end tooth at each axial end, or cutting out other teeth such as second, third or further teeth in the end part of the core, (2) one or more rightangled triangular pillars are attached on the end tooth on each axial end of the core by bonding or, (3) the outermost end tooth and a plurality of teeth adjacent to the end tooth at both axial end are slantly cut by a plane slantly extending from one lengthwise side of the core to the other side of the core.

Thus the present invention can provide remarkable meritorious effects to the field of linear DC brushless motor.

While the invention has been particularly shown and described in reference to preferred embodiments thereof, it will be understood by those skilled in the art that changes in form and details may be made therein without departing from the spirit and scope of the invention.

What is claimed is:

1. A linear DC brushless motor, comprising:
   a stator having a set of permanent magnets and an armature core having a plurality of teeth and a plurality of armature windings,
   wherein the armature core has a first end portion and a second end portion opposite said first end portion,
   wherein at least one tooth at each of said first and second end portions in the direction of travel of said armature core has a different unit volume than other teeth in said armature core, and a tooth at said first end portion is diagonally opposed to another tooth at said second end portion and being asymmetrical with respect to the center line in the direction of travel of said armature core to thereby reduce the detent thrust to be formed due to the end effect of the armature core by making the wave form of the thrust into a more gentle shape by avoiding abrupt change of permeance.

2. A linear DC brushless motor as claimed in claim 1, wherein at least the tooth at each end is cut away.

3. A linear DC brushless motor as claimed in claim 1, wherein the tooth at each end is cut away by a half transverse width of of said said teeth.

4. A linear DC brushless motor as claimed in claim 1, wherein the tooth at each end is cut to have its remained width of about one third and full teeth width and the second tooth from each end to have two thirds of the full teeth.

5. A linear DC brushless motor as claimed in any one of claims 1 through 4, wherein said armature core is a laminated body formed by stacking thin sheets of magnetic material.

6. A linear DC brushless motor as claimed in any one of claims 1 through 4, wherein said armature core is formed by compacting powdered iron.

7. A linear DC brushless motor as claimed in claim 1, wherein said end face of the tooth at each end, respectively, is attached integrally with an end member or members having a rightangled triangular pillar or pillars of the same size.

8. A linear DC brushless motor as claimed in claim 6, wherein said end member attached to the end tooth at each end of the armature core is a rightangled triangular pillar having its top and bottom faces each having a side length the same as that of the transverse length of said armature core.

9. A linear DC brushless motor as claimed in claim 7 through 8 wherein said armature core is a laminated body formed by stacking thin sheets of magnetic material one after another.

10. A linear DC brushless motor as claimed in claim 7 and 8 wherein said armature core is formed by compacting iron powders.

11. A linear DC brushless motor as claimed in claim 1, wherein said armature core has such a construction that a plurality of teeth from each end are formed by slantly cutting away the normal teeth of full length by a plane passing through the transversely outermost ridge of the end tooth at one side and the outermost ridge of the tooth of the specified order at the transversely opposite side of the armature core.

12. A linear DC brushless motor as claimed in claim 11, wherein said plurality of teeth at each end to be cut away by the slantly extending plane are three in number including the tooth at the lengthwise outermost end.

13. A linear DC brushless motor as claimed in claim 11 or 12, wherein said armature core is a laminated body formed by stacking thin sheets of magnetic material one after another.

14. A linear DC brushless motor as claimed in claim 11 or 12, wherein said armature core is formed by compacting powdered iron.

* * * * *